United States Patent [19]
Little

[11] 3,953,610
[45] Apr. 27, 1976

[54] HIGH TEMPERATURE DIRECT ACIDIFICATION OF MILK

[75] Inventor: Lawrence L. Little, Creve Coeur, Mo.

[73] Assignee: Battelle Development Corporation, Columbus, Ohio

[22] Filed: Jan. 31, 1975

[21] Appl. No.: 546,028

[52] U.S. Cl. .................................. 426/39; 426/36; 426/40; 426/582
[51] Int. Cl.² ......................................... A23C 19/02
[58] Field of Search .................. 426/36, 38, 40, 25, 426/89, 582

[56] References Cited
UNITED STATES PATENTS
3,793,465   2/1974   Bohren ............................ 426/43 X
3,882,250   5/1975   Lofer et al. ....................... 426/40 X FOREIGN PATENTS OR APPLICATIONS
4,532,217   1967   Japan Primary Examiner—David M. Naff
Attorney, Agent, or Firm—Kenneth E. Shaweker; Kenneth R. Warburton; Thomas W. Winland

[57] ABSTRACT

The pH of milk is lowered to 4.5 to 5.5 by direct acidification without the necessity of cooling the milk to avoid local coagulation and casein precipitation by adding acid as a spray from above a portion of the milk surface undergoing high velocity mixing.

6 Claims, 2 Drawing Figures

HIGH TEMPERATURE DIRECT ACIDIFICATION OF MILK

BACKGROUND OF THE INVENTION

The present invention relates to that field of the art where milk is converted to coagulated milk products such as cottage cheese by the addition of chemicals rather than the use of natural bacteriological cultures. The greatest obstacle has been the inability to incorporate the acid into the milk without the premature coagulation of the milk precipitation of the casein. In fact, every commercial process for making cottage cheese by the direct acidification of the milk is based on the principle of acidifying the milk at refrigeration temperature (40°F) and subsequently warming the milk. The attempts to acidify milk for cottage cheese at a temperature of 70° are legion, and all of them have been failures.

Fresh fluid milk can be acidified by direct addition of acid to a pH of about 4.50 or above at a temperature of about 40°F without any significant tendency for the milk to coagulate, or for the casein to precipitate or flocculate. Furthermore, it is possible to subsequently warm the acidified milk to a temperature of 70°–80°F without any significant tendency of the milk to coagulate or the casein to precipitate.

The above principle is the basis of several patented processes for the direct acidification of milk in the manufacture of cottage cheese or Baker's cheese. While this principle, and the processes based on it, have made a considerable contribution to the elimination of uncontrollable variations and the resulting loss of product quality (and even complete product loss), there are still some very serious shortcomings in the above principle of acidifying milk by the direct addition of acid.

First, most cottage cheese manufacturers who use natural culturing to acidify the milk do so at a temperature near 90°F. Therefore if such a manufacturer wanted to convert to a prior art direct acidification technique he must provide means for cooling the milk to 40°F and means for warming the acidified milk to about 70°F in the vat. The expense of equipment to cool large volumes of milk is a large capital expenditure.

In addition, the normal vat used for processing is an inefficient heat exchanger and many of the time saving advantages of direct acidification are obviated by the time consuming process of cooling the milk down to 40°F and then heating it back up to 70°F after the acidification. This time may amount to several hours for large vats and that may exceed the time saved by the direct acidification process.

Furthermore, the rate of heating of the milk from 40° to 70°F must be carefully controlled so as to prevent the impairment of product quality and an operator error may render the entire batch unsuitable for its intended use.

The present invention eliminates the necessity for the cooling of milk down to 40°F for the acidification process and the necessary heating of the milk back to the coagulating temperature by spraying the liquid acid directly into the milk at a temperature of from 60° to 90°F at a location where the milk is moving and mixing with the surrounding milk at high velocity.

This eliminates the equipment, energy and time problems inherent in other direct acidification techniques and significantly improves the economics of the entire process.

BRIEF SUMMARY OF THE INVENTION

The present invention is a method of lowering the pH of milk by direct acid additions down to a pH of 4.50 without the necessity of cooling the milk to avoid local coagulation and casein precipitation. The milk to be acidified is locally mixed at high velocity and the acid sprayed on the milk at a location of high velocity mixing. If the velocity of mixing is sufficient there is little if any local overconcentration of acid and therefore little if any local precipitation or coagulation.

DETAILED DESCRIPTION OF THE INVENTION

Figure 1:
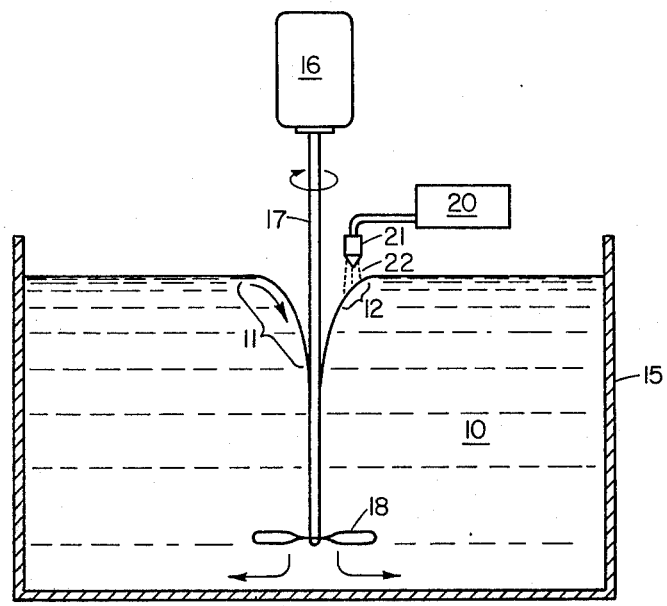
FIG. 1 is one embodiment illustrating the subject invention using a propeller type agitator to create the high velocity mixing.

FIG. 1 is a partial cross section of a tank 15 containing a quantity of liquid milk 10. A motor 16 drives a shaft 17 immersed in the milk with a propeller 18 attached to the shaft. The rotation of the shaft imparts motion to the surrounding milk and if the propeller moves enough liquid milk at a high enough velocity a vortex 11 is formed.

The crux of the present invention is that liquid acid can be directly introduced to the milk 10 in the form of a spray 22 at rates far in excess of prior art techniques without local coagulation or casein precipitation if it is introduced to a location undergoing high velocity mixing.

The embodiment shown in FIG. 1 has a supply of liquid acid 20 connected to a nozzle 21 producing a spray of acid 22 onto a portion 12 of the milk 10 where there is high velocity mixing.

Figure 2:
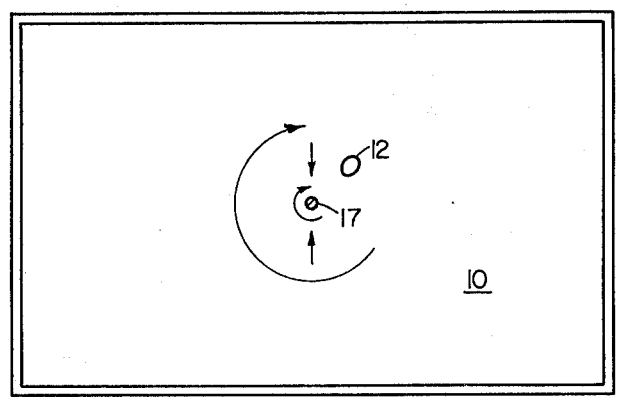
FIG. 2 is an additional view of the apparatus of FIG. 1 showing the relative directions of the movement of the milk in relation to the location of acid introduction.

FIG. 2 shows the two components of motion of the milk in a vortex with one component of motion in the direction of rotation of the shaft 17 and the second component of motion parallel to the shaft itself toward the propeller 18. The area 12 indicates where the spray 22 would be oriented in relation to the vortex if introduced to the vortex in the manner shown in FIG. 1.

High velocity mixing may occur at points other than the vortex shown in the figures and it would appear that other mixing arrangements may be operable so long as the mixing is sufficient to disperse the acid before local concentrations of the acid cause local coagulation or casein precipitation. It has been found, for example, that when an impeller type agitator rotating at approximately 1450 rpm imparts motion to the surrounding milk in a stirring tank measuring 24 inches long by 12 inches wide, high velocity mixing occurs along lines of turbulence running parallel and near to each of the longer tank walls. These lines of turbulence, properly termed "shoal-lines", may occur in much larger stirring tanks if baffle plates or other similar obstructions are attached to the tank floor or walls, or both.

Since the major advantage of the present invention is the significant increase in the rate at which milk can be acidified without detrimental local acidification it should be defined as to what defines the upper and lower bounds of the operable acidification rates. The upper limit on the acidification rate would be where the acid is not dispersed quickly enough to prevent local coagulation and casein precipitation in amounts so as to effect the quality of the desired end product. It should be noted that even within ranges taught herein to be operable or even preferred, there may be such local coagulation and casein precipitation, however, the amounts are so insignificant that the effect is negligible. The lower limit on the rate of acidification is that rate that becomes uneconomic with respect to alternative methods. If economy was not a factor the milk could be successfully acidified with little mixing by adding dilute acids over long periods of time.

The rate at which acid can be added to milk without causing detrimental local effect is determined by many factors. The prior art recognizes the effect of milk temperature on the acidification rate and that forms the basis for most prior art acidification techniques using simple liquid acids. SInce the temperature manipulation of large quantities of milk is at best uneconomic and at worst a source of operator error capable of ruining the entire batch the present invention does not rely on the heating and cooling of milk for the acidification. It should be recognized that while the present invention is most economically utilized without changing the milk temperature one skilled in the art may use the present invention at various temperatures without effecting the operability of the basic invention.

Assuming the milk is at a constant temperature there are two major parameters that determine if the milk will be detrimentally effected by the acidification. First is the effectiveness of mixing after the acid has been added as a spray. The most effective way to quantitize mixing effectiveness for such an industrial process is to use the velocity of the milk at the point where the spray is introduced to the milk. It should be noted that the actual number value of a velocity is not universally applicable to all embodiments of the invention as such a value is related to the second primary parameter (rate of $H^+$ eq addition per unit time) as well as a number of secondary effects to be discussed subsequently. It is sufficient to one having ordinary skill in the art to simply note that detrimental local acidification effects can be eliminated by adding the acid as a spray at a location on the milk which is mixing at high velocity. Knowing the mixing must be done at high velocity one skilled in the art would need only acidify with an amount of acid precalculated to give the desired final pH and note the presence of local coagulation and casein precipitation. I have found that when the temperature of the milk is between 60° and 90°F the velocity of the milk should exceed approximately 4 ft/sec at the location where the acid is introduced to the milk. It should be noted that the velocity is measured at a location of high velocity mixing, not merely high velocity. The introduction of an acid spray to milk simply moving (but not mixing) at high velocity will give rise to detrimental local acidification.

The second primary parameter is the rate at which hydrogen ions are added to the milk. The examples herein set out the limits for the acidification rate for the embodiment shown in the figures. In general I have found that when milk is undergoing high velocity mixing at a bulk temperature in the range of from 60° to 90°F, hydrogen ion concentration as measured in $H^+$ equivalents can be up to 4.69 $H^+$eq/min at each spray nozzle. Again, this parameter, as was the velocity parameter, is applicable to the embodiment shown in the figures and one skilled in the art may devise an operable system having a higher acidification rate depending on the combination of parameters used.

The preferred upper limit on the acidification rate was determined by tests set out in the examples where the velocity of the milk at the location where the acid spray was introduced was kept approximately constant at about 5 ft/sec and only the rate of acid addition was changed. The acid used was $H_3PO_4$ since it is approved for consumption and is widely used in direct acidification techniques. It should be obvious that any edible soluble acid may be used and it is the purpose of the following calculation to make the invention applicable to any usable acid regardless of its concentration or $H^+$ equivalents/mole.

At the highest acidification rate 273 cc/min of 75% $H_3PO_4$ were added to the milk in an amount that would yield 140.25 grams of pure $H_3PO_4$. The 140.25 grams was divided by 98 grams/mole to yield 1.43 moles of pure $H_3PO_4$. Although $H_3PO_4$ theoretically has 3 $H^+$ equivalents per mole, not all three hydrogen ions are available in solution and it has been determined that $H_3PO_4$ actually supplies approximately 1.2 $H^+$ equivalents per mole. Therefore the incoming acid had 1.2 $H^+$eq/mole × 1.42 moles = 1.72 $H^+$eq in each 100 cc of 75% $H_3PO_4$. At the highest usable acidification rate of this embodiment a nozzle sprayed 73.9 cc of acid into the milk in 0.271 minutes or at a rate of 273 cc/min. Therefore the rate of acidification was 273 cc/min × 0.0172$H^+$eq/cc or 4.69 $H^+$eq/min.

This parameter was developed using 5 gallon batches of reconstituted nonfat dry milk containing 11.0% solids. The high velocity mixing was carried out with a 2 inch propeller turning at a speed between 1500 and 2000 rpm.

Other parameters that have only a secondary effect on the rate of acidification include: the concentration of the acid within the spray droplet, size and velocity of the droplet, the concentration of droplets in the spray and any effects due to the total amount of milk to be acidified (i.e., bulk effects).

The concentration of acid within the drop would effect the acidification rate by changing the local concentration of acid before the mixing disperses the acid within the milk. The concentration of acid would also effect the dilution effect of the acidification and the concentration used would be a compromise between the dilution effect and the possible local overconcentration if highly concentrated acids were used. Additional considerations would be the cost of the acid itself and the economics of equipment for use with various concentrations of acid.

The size and velocity of the droplets in the spray interact with the rate of mixing with the rate of mixing playing a dominant role in whether local overconcentration occurs. Also the number of droplets in the spray could affect the occurence of local overconcentrations again depending primarily on the effective mixing of the acid where the acid spray impinges on the milk.

The present invention has as its primary utility the improvement of the direct acidification technique for the production of cottage cheese. In such a process there is agitation of the milk and the present invention was contrasted with the prior art in each example. In the examples, the bulk temperature of the milk was in the range of from 60° to 80°F, and the milk was acidified to three different final pH's using 75% $H_3PO_4$ in the amount of 2.8, 3.1, and 3.4 cc/100 grams of solids in the 5 gallon batches of 11% solid reconstituted nonfat dry milk. Three separate nozzles were used to generate the acid spray; small (No. 1 — 1/32 in.) medium (No. 2 — 3/64 in.), and large (No. 3 — 1/16). In each example the rate of acidification determined for the 5 gallon batch is extrapolated out to a 1000 gallon batch to indicate the significant savings in time using the present invention in commercial embodiments.

EXAMPLE 1

Using the small nozzle and only paddle agitation 60.8 cc of acid were added (2.8 cc/100 g solids) in 2.59 minutes. The pH of the milk was 5.13 after acidification and there were many flakes of casein present. Such a process with 1000 gallons would take 10,550 cc of acid and 450 minutes or 7.5 hours.

Using high velocity mixing at the point of acid spray impingement the final pH was 5.13 with no visible casein precipitation. Using a 20 nozzle spray a 1000 gallon batch of such milk could be acidified at the equivalent rate in 22.5 minutes.

EXAMPLE 2

Again using the small nozzle and paddle agitation 67.4 cc of acid were added (3.1 cc per 100 g solids) in 2.87 minutes the pH of the milk was 5.08 after acidification, and there were many flakes of casein present. Such a process with a thousand gallons would take 11,700 cc of acid and 498 minutes, or 8.3 hours.

Using high velocity mixing at the point of acid spray impingement the final pH was 5.01 with no visible casein precipitation. Using a 20 nozzle spray a thousand gallon batch of such milk would be acidified at the equivalent rate in 24.9 minutes.

EXAMPLE 3

Again using the small nozzle and paddle agitation 73.9 cc of acid were added (3.4 cc per 100 g solids) in 3.14 minutes the pH of the milk was 4.95 after acidification, and there were many flakes of casein present. Such a process with a thousand gallon batch would take 12,850 cc of acid and 547 minutes to add, or 9.1 hours.

Using high velocity mixing at the point of acid spray impingement the final pH was 4.90 with no visible casein precipitation. Using a 20 nozzle spray a thousand gallon batch of such milk could be acidified at the equivalent rate in 27.4 minutes.

EXAMPLE 4

Using the medium nozzle and paddle agitation 60.8 cc of acid were added (2.8 cc per 100 g solids) in 0.61 minutes, the pH of the milk was 5.10 after acidification and there were many flakes of casein present with some being quite large. Such a process with 1000 gallons of milk would take 10,550 cc of acid and 105.5 minutes to add or 1.76 hours.

Using high velocity mixing at the point of acid spray impingement the final pH was 5.11, with a few tiny flakes of casein present in insignificant amounts. Using a 20 nozzle spray a 1000 gallon batch of such milk could be acidified at the equivalent rate in 5.27 minutes.

EXAMPLE 5

Again using the medium nozzle and only paddle agitation 67.4 cc of acid were added (3.1 cc per 100 g solids) in 0.67 minutes. The pH of the milk was 5.03 after acidification and there were many flakes of casein present (both large and small) after acidification. Such a process with a 1000 gallon batch would take 11,700 cc of acid and 117 minutes or 1.95 hours.

Using high velocity mixing at the point of acid spray impingement the final pH was 5.01 with very few small flakes of casein present in insignificant amounts. Using a 20 nozzle spray a 1000 gallon batch of such milk could be acidified at the equivalent rate in 5.85 minutes.

EXAMPLE 6

Again using the medium nozzle and only paddle agitation 73.9 cc of acid were added (3.4 cc per 100 g solids) in 0.74 minutes. The pH of the milk was 4.89 after acidification and there were many flakes of both large and small casein present after acidification. Such a process with a 1000 gallon batch would take 12,850 cc of acid and 128.5 minutes or 2.14 hours.

Using high velocity mixing at the point of acid spray impingement, the final pH was 4.97 with a few small flakes of casein present in insignificant amounts. Using a 20 nozzle spray a 1000 gallon batch of such milk could be acidified at the equivalent rate in 6.43 minutes.

EXAMPLE 7

Using the large nozzle and only paddle agitation 60.8 cc of acid were added (2.8 cc per 100 g solids) in 0.223 minutes. The pH of the milk was 5.20 after acidification and there was a large amount of precipitated casein present in the form of a layer on the surface of the milk after acidification. Such a process with a 1000 gallons of milk would take 10,550 cc of acid and 38.7 minutes.

Using high velocity mixing at the point of acid spray impingement the final pH was 5.12 with few very large flakes of casein present in relatively large but not detrimental amounts. This rate of acidification would seem to be the highest feasible rate of acid addition for this particular embodiment adding acid in an amount of 2.8 cc per 100 g of solid. Using a 20 nozzle spray a 1000 gallon batch of such milk could be acidified at the equivalent rate in 1.93 minutes.

EXAMPLE 8

Again using the large nozzle and only paddle agitation 67.4 cc of acid were added (3.1 per 100 g solids) in 0.247 minutes. The pH of the milk was 5.12 after acidification and there was a large amount of precipitated casein in the form of a layer on top of the milk. Such a process for the 1000 gallons would take 11,700 cc of acid and 49.2 minutes.

Using high velocity mixing at the point of acid spray impingement the final pH was 5.03 with many small flakes of casein present in amounts that would not detrimentally affect the product. This would represent the highest rate acidification for this embodiment using 3.1 cc of acid per 100 g of solids. Using a 20 nozzle spray, a 1000 gallon batch of such milk could be acidified at the equivalent rate in 2.14 minutes.

EXAMPLE 9

Again using large nozzle and only paddle agitation 73.9 cc of acid were added (3.4 cc per 100 g solids) in 0.271 minutes. The pH of the milk was 5.04 after acidification and there was a large amount of precipitated casein present in the form of a layer on the surface of the milk. Such a process for 1000 gallons would take 12,850 cc of acid and 47.2 minutes to add.

Using high velocity mixing at the point of acid spray impingement the final pH was 4.95 with many large flakes of casein large and small present in an amount that would not be detrimental to the final product. This would represent the highest acidification rate possible with this embodiment using 3.4 cc of acid per 100 g solids. Using a 20 nozzle spray a 1000 gallon batch of such milk could be acidified at the equivalent rate in 2.36 minutes.

EXAMPLE 10

The present invention was also utilized in a process of making cottage cheese with a direct acidification technique. Five gallons of milk was acidified with 75% phosphoric acid in an amount of 2.2 cc per 100 g solids. The milk was mixed at high velocity with a 2 inch propeller agitator rotating at a speed of approximately 1500 to 2000 rpm. The agitation of the milk created a high velocity circular motion in the milk (a vortex) and the acid was added in the form of a spray through the Number 2 nozzle at a location on the vortex undergoing the high velocity mixing. The milk was at a temperature of 70°F and the pH of the milk after acidification was 5.28. After acidification there were tiny flakes of casein present in the milk but of an insignificant amount.

Coated fumeric acid powder was added in the amount of 3.0 g per 100 g of solids in the milk and single strength rennet was added in the amount of 30.0 cc per 100 gallons of the milk. The pH of the milk was then 5.18. The milk was allowed to set undisturbed for 90 minutes then cut with ¼ by ¼ inch knives. The pH at the time the curd was cut was 5.15.

After cutting, the curd was allowed to set undisturbed for 15 minutes. The heating jacket on the vat was then filled with 90° to 100° water with the temperature of the water slowly increased. The curd was stirred carefully every 5 minutes. The curd was cooked at a temperature of 125°F over a 1 hour cooking period.

The whey was then drawn off and replaced with 40° cold water and allowed to set for 15 minutes.

The rinse water then drawn off and a second 40° rinse water solution was applied and allowed to remain for 20 to 30 minutes. This rinse water was drawn off and the curd left to drain dry. The resulting product was weighed, tested for pH, and the percent solids. At the time of cutting the coagulation was firm and brittle with a streak of whey near the outlet of the vat. The cubes were durable with minimal shattering during cutting and cooking and there was no matting of the cubes. The resultant curd was firm, meaty, tender, with excellent texture and no visible fines of lumps.

| Properties | |
|---|---|
| Final pH of the whey | 4.40 |
| pH of the curd | 4.73 |
| Weight of the curd (grams) | 4075 |
| Percent solids in curd | 19.9 |
| Yield in percent | 20.5 |
| Yield in pounds curd per pound solid | 1.87 |

EXAMPLE 11

The milk was acidified with 75% phosphoric acid in the amount of 2.8 cc per 100 g solids. The milk was again agitated at high velocity with a 2 inch propeller rotating at 1500 to 2000 rpm. The acid was added in the form of a spray to a location on the vortex through a Number 2 nozzle with the milk at a temperature of 70°F. The pH of the milk after acidification was 5.05 and there was no trace of casein precipitation. The coated fumeric acid was added in the amount of 2.0 g per 100 g solids and single strength rennet was added in the amount of 30.0 cc per 100 gallons. The final pH was 5.02.

From this point the batch was handled in the same manner as was in Example 10. At the time the curd was cut the pH of the product was 5.01.

The resulting coagulation was firm with a film of whey on top. The cubes were durable with minimal shattering and no matting and of excellent quality. The curd was firm, meaty and tender, with a good texture.

| Properties | |
|---|---|
| Final pH of the whey | 4.50 |
| pH of the curd | 4.80 |
| Weight of the curd (grams) | 4010 |
| Percent solids in curd | 20.2 |
| Yield in percent | 20.5 |
| Yield in pounds curd per pound solid | 1.87 |

EXAMPLE 12

The milk was acidified as described in Examples 10 and 11 in an amount of 3.1 cc per g solids. The pH of the milk after acidification was 5.01. There was no precipitated casein detected. Coated fumeric acid powder was added in the amount of 1.75 g per 100 g of solids. Rennet was added in an amiunt 30 cc per 100 gallons of milk. The pH was 4.99. The milk was allowed to set, was cut, cooked, and washed as in Examples 10 and 11.

The milk formed a firm coagulation with a trace of whey on top. The cubes were durable with minimal shattering and no matting. The cubes contained a normal amount of fines, no lumps. The curd was firm and meaty with excellent texture but was somewhat tender.

| Properties | |
|---|---|
| Final pH of the whey | 4.52 |
| pH of the curd | 4.75 |
| Weight of the curd (grams) | 4360 |
| Percent solids in curd | 19.5 |
| Yield in percent | 22.7 |
| Yield in pounds curd per pound solid | 1.96 |

EXAMPLE 13

The milk was acidified as in Examples 10 through 12 in the amount of 3.4 cc per 100 g solids. The pH of the milk after acidification was 4.98. There was no detectable precipitated casein. Coated fumeric acid powder was added in the amount of 1.5 g per 100 g of solids and rennet added in the amount of 30 cc per 100 gallons. The final pH was 4.95. The milk was allowed to set, was cut, cooked, and the curd washed as in the previous example.

The milk formed a firm coagulation with a film of whey on top, The cubes were durable with minimal shattering and no matting. The cubes had normal fines, no lumps, and formed a firm, meaty and tender curd with good texture.

| Properties | |
|---|---|
| Final pH of the whey | 4.54 |
| pH of the curd | 4.83 |
| Weight of the curd (grams) | 4230 |
| Percent solids in curd | 20.6 |
| Yield in percent | 22.0 |
| Yield in pounds curd per pound solid | 2.0 |

EXAMPLE 14

Fresh fluid skim milk pasteurized at a temperature of 170°F for 18 seconds was used in a batch of 5.75 gallons (22.813 grams) containing 8.97% solids. The milk was acidified with 75% phosphoric acid in an amount of 2.8 cc per 100 g solids. The acidification was again directed to a vortex in the milk generated by the rotation of a 2 inch propeller agitator at a speed of about 1500 rpm. The temperature of the milk acidification was 70°F and the pH of the milk after acidification was 5.20. There was no evidence of casein flaking or precipitation. Coated fumeric acid powder was added to the milk in the amount of 2 g per 100 g of solid in the milk and single strength rennet was added in the amount of 30 cc per 100 gallons of milk. The pH of the milk after the addition was 5.05. The milk was allowed to set undisturbed for 90 minutes, then cut with ¼ by ¼ inch knives. The pH at the time the curd was cut was 5.02. The curd was cooked, drained and washed as in the previous example.

The resulting cubes were durable with minimal shattering during the cutting and cooking. There was a slight matting of the cubes. The finished cheese had excellent cubes with normal fines and a few small lumps of cubes. The curd was firm, meaty and tender with good texture.

| Properties | |
|---|---|
| Final pH of the whey | 4.52 |
| pH of the curd | 4.75 |
| Weight of the curd (grams) | 3975 |
| Percent solids in curd | 18.4 |
| Yield in percent | 16.0 |
| Yield in pounds curd per pound solid | 1.79 |

EXAMPLE 15

The fresh fluid skim milk was acidified with 75% phosphoric acid in the amount of 3.1 cc per 100 g of solids in the same manner as the previous example. The pH of the milk after acidification was 5.05 with no evidence of casein flaking or precipitation. Coated fumeric powder was added in the amount of 1.75 pounds per 100 g of milk solids and single strength rennet was added in the amount of 20 cc per 100 gallons of milk. The pH of the milk after the additions was 4.98. The milk was allowed to set undisturbed for 90 minutes and cut, cooked, and washed as in the previous example. The pH of the milk at the time the curd was cut was 4.99.

The curd shattered somewhat in cutting but no matting occurred during the cooking. The resulting cubes had normal fines and a few small lumps. The curd was firm, not meaty, tender, and too soft.

| Properties | |
|---|---|
| Final pH of the whey | 4.58 |
| pH of the curd | 4.77 |
| Weight of the solids (grams) | 3735 |
| Percent solids in the curd | 19.4 |
| Yield in percent | 16.0 |
| Yield in pounds curd per pound solid | 1.75 |

EXAMPLE 16

Fresh fluid skim milk as used in the previous example was acidified at a temperature of 70° with 75% phosphoric acid in the amount of 3.4 cc per 100 g solids. The pH of the milk after the acidification was 4.98 and there were several small flakes of casein present but in insignificant amounts. Coated fumeric acid was added in the amount of 1.5 g per 100 g of solids in the milk. Single strength rennet was added in the amount of 20 cc per 100 gallons of milk and the pH after these additions was 4.92. The milk was allowed to set, was cut, cooked, and washed, as in the previous example. The pH at the time the curd was cut was 4.85.

The resulting curd was fragile and shattered badly in cutting and cooling. There was a very slight matting. The cubes were fairly good but there were excessive fines. The curd was tender and slightly mealy, but not meaty.

| Properties | |
|---|---|
| Final pH of the whey | 4.65 |
| pH of the curd | 4.83 |
| Weight of the curd (grams) | 4850 |
| Percent solids in curd | 16.7 |
| Yield in percent | 17.4 |
| Yield in pounds curd per pound solid | 1.93 |

The present invention has been shown both as a general method of acidifying milk and incorporated in a direct acidification technique for forming cottage cheese. One skilled in the art may incorporate variations of the invention not specifically disclosed by the specification and remain within the scope of the invention as defined solely by the appended claims.

I claim:

1. A process of lowering the pH of milk by direct acid additions to milk at a temperature of from 60° to 90°F, comprising: adding said acid as a spray from above the milk surface at a location in said milk where a minor portion of said milk is mixing at a high velocity in contact with a major portion of said milk, wherein the velocity of the milk at said location is in excess of about 4 feet per second, and wherein said acid is added at a rate of from about 0.4 to 4.69 $H^+$ equivalents per minute to yield a final pH in the range of from about 4.5 to 5.5.

2. The process of claim 1 where said minor portion of said milk is induced to a high velocity in the form of a vortex by the application of a rotating propeller to the milk.

3. The process of claim 2 where said acid is introduced to said vortex in the form of a spray from a plurality of orifices.

4. The process of claim 3 where said milk is at a temperature of approximately 70°F.

5. In a process of making cheese products by the coagulation of a preacidified milk mixture with a coagulating enzyme which includes the step of incorporating a dispersion of coated particulate acid within said mixture with said coated particulate acid disposed to further acidify said mixture during the cooling thereof subsequent to coagulation, the improvement comprising:

acidifying said milk, prior to coagulation, by spraying from above the milk surface a minor portion of said milk with liquid acid while said minor portion mixes at high velocity in contact with a major portion of said milk, wherein the velocity of the minor portion where the acid is added is in excess of about 4 feet per second, and wherein said acid is added at a rate of from 0.4 to 4.69 $H^+$ equivalents per minute to yield a final pH in the range of from about 4.5 to 5.5, and wherein said milk is at a temperature of from 60° to 90°F.

6. The process of claim 5 where said minor portion of said milk is induced to a high velocity in the form of a vortex by the application of a rotating propeller to the milk.

* * * * *